United States Patent [19]

Molloy et al.

[11] Patent Number: 4,571,226
[45] Date of Patent: Feb. 18, 1986

[54] MOLDABLE PLASTIC PULLEY

[75] Inventors: Edward W. Molloy; Raymond L. Richard, Jr., both of Port Clinton, Ohio

[73] Assignee: General Motors Corporation, Detroit, Mich.

[21] Appl. No.: 584,001

[22] Filed: Feb. 27, 1984

[51] Int. Cl.⁴ .............................................. F16H 55/48
[52] U.S. Cl. .................... 474/190; 474/180; 474/902
[58] Field of Search ............... 474/902, 903, 179–183, 474/190, 191, 195, 197

[56] References Cited

U.S. PATENT DOCUMENTS

| | | | |
|---|---|---|---|
| 237,910 | 2/1881 | Ryno | 474/180 X |
| 398,897 | 3/1889 | Kisinger | 474/180 |
| 893,889 | 7/1908 | Zamboni | 474/180 |
| 2,933,934 | 4/1960 | Haroldson | 474/180 |
| 3,618,411 | 11/1971 | Rottweiler | 474/183 |
| 3,848,309 | 11/1974 | Nuss | 474/180 X |
| 4,068,907 | 1/1978 | Zenthoefer | 474/902 X |
| 4,177,685 | 12/1979 | Delancey | 474/902 X |
| 4,193,310 | 3/1980 | Boyer et al. | 474/91 |

Primary Examiner—Stephen J. Novosad
Assistant Examiner—Thuy M. Bui
Attorney, Agent, or Firm—Patrick M. Griffin

[57] ABSTRACT

A moldable, plastic idler pulley is formed of two halves, each having a matching central hub and a radially outwardly extending web with radially disposed strengthening ribs on the outside thereof. The inner side of each central hub has a moldable stepped portion which closely mates the other hub. The stepped portions of each hub and the ribs have no under cuts or reverse bends and may be molded by two simple, axially parting mold elements. After molding, the ribs cooperate with a rotary machine to allow the stepped portions of each hub to be spin welded together. A central bearing may be captured between the hubs during the welding process, if desired.

1 Claim, 3 Drawing Figures

U.S. Patent   Feb. 18, 1986   4,571,226
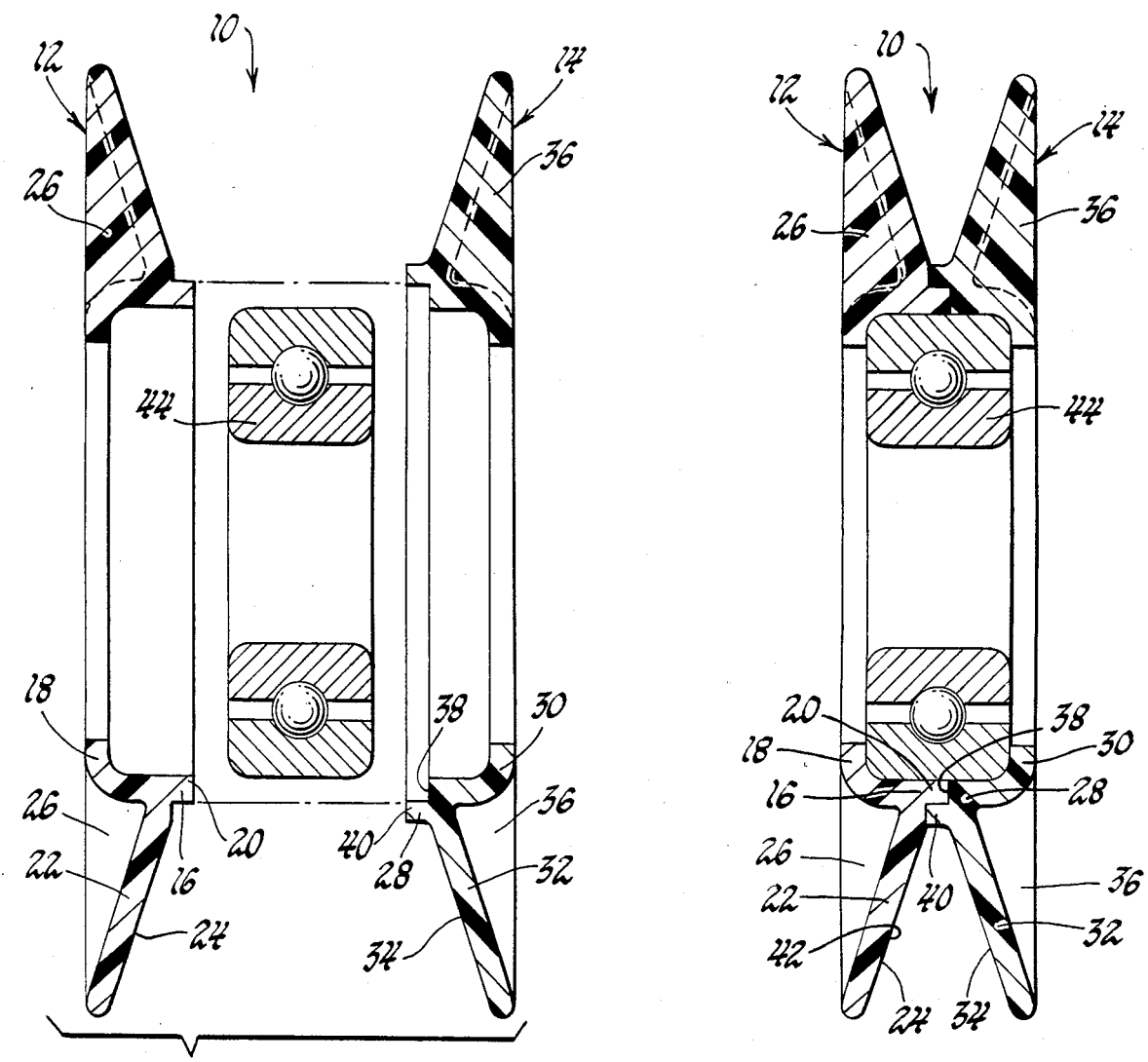
*Fig. 1*
*Fig. 2*
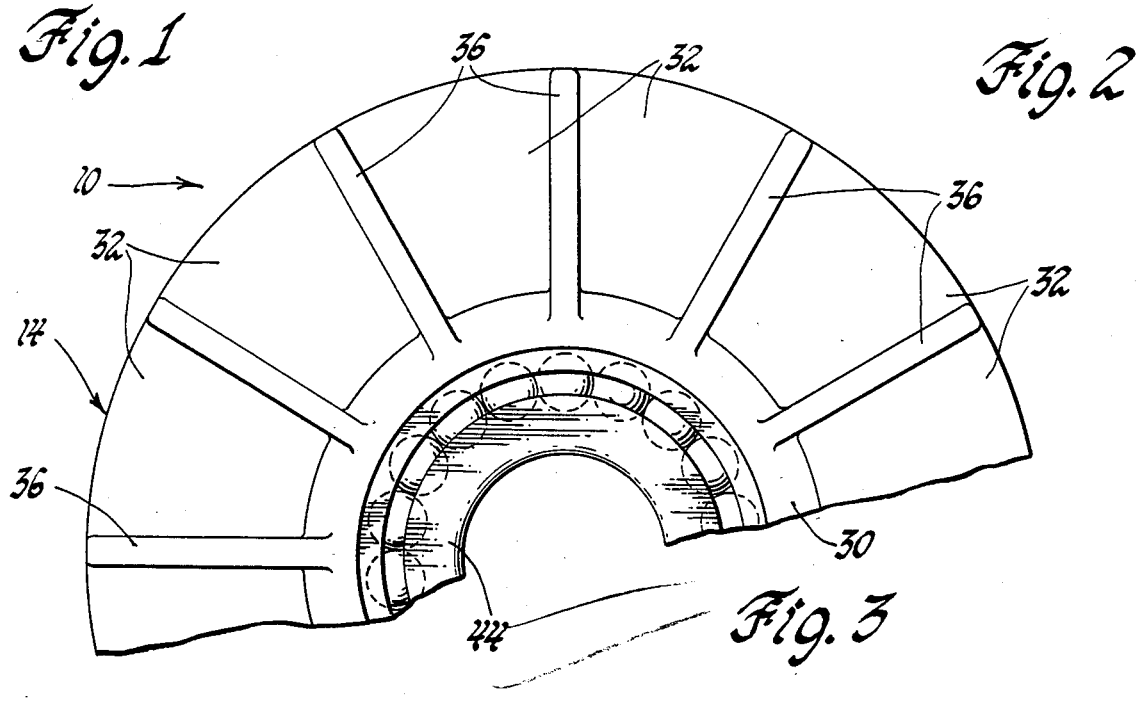
*Fig. 3*

MOLDABLE PLASTIC PULLEY

This application relates to pulleys and specifically to a molded plastic idler pulley in which a bearing or central hub may be incorporated.

BACKGROUND OF THE INVENTION

Idler pulleys are generally formed of metal, stamped or cast, but may also be molded of plastic. It is known to form an idler pulley of two molded plastic pieces, and then join them together afterwards by various means. The U.S. Pat. No. 4,193,310, to Boyer et al, shows a two piece plastic idler pulley in which two separately molded sheaves are held together by rivets. Clearly, the strength of such a unit is limited to the strength of the separate fastening members, and a pulley molded of a single piece would have inherently greater strength. However, such a pulley, as may be seen in U.S. Pat. No. 4,177,685, to Delancy. FIG. 1, would, of necessity, have some parting line left in the V-belt groove by a movable mold member. In addition, if it were desired to insert a central bearing or other separate member in the hub, it would have to be separately placed into and held in the mold.

SUMMARY OF THE INVENTION

The plastic idler pulley of the invention solves the above discussed shortcomings in the prior art by providing a moldable plastic two piece pulley in which the separate halves may be spun welded together to provide a strong unit. In addition, a metal hub may be easily placed into the center of the pulley before spinning and the belt engaging groove of the pulley is smooth and without parting lines. Furthermore, reinforcing ribs on the outside of each half of the pulley cooperate to allow the halves to be spun welded together by engagement with suitable rotary powered source.

The idler pulley of the invention is comprised of first and second halves or sheaves each of which has a generally cylindrical hub with a stepped portion on the axially inner side and a generally radially outwardly extending web which is integral therewith. The surface of the web and the stepped hub portion of each sheave comprise a continuous surface which is moldable such that the belt engaging portion of the surface, as seen in radial cross section, does not return or reverse bend relative to the axis of the hub. Each sheave also includes a series of radially disposed reinforcing ribs on the axially outer side thereof which are disposed in planes which include the axis of the hub, and are therefore also moldable.

The stepped portions of each hub are complementary or interfitting, thereby allowing them to be placed together in a close matching engagement. The two sheaves may then be spun or friction welded together by a suitable rotary power source which engages the radial strengthening ribs. This forms a pulley of a strength comparable to a single piece molded pulley, but with no parting lines on the belt engaging V-groove. In addition, the hub may be provided with suitable flanges to contain a bearing or other separate metal hub placed therein before the friction welding.

It is, therefore, an object of the invention to provide a two piece moldable plastic idler pulley with a strength comparable to a one piece molded pulley. It is another object of the invention to provide such a pulley wheel which has a belt engaging groove free of parting lines which may cause wear on the belt.

It is a further object of the invention to provide such a pulley wheel in which radially directed strengthening ribs also cooperate in the spin welding process.

It is yet another object of the invention to provide such a pulley wheel in which a central bearing or metal hub may be placed without molding it in.

BRIEF DESCRIPTION OF THE DRAWINGS

These and other objects of the invention will appear from the following written description of the drawings in which:

FIG. 1 is an exploded cross section of the pulley wheel of the invention;

FIG. 2 is a view from the same perspective as FIG. 1 with the various parts assembled together;

FIG. 3 is a partial plan view of the assembled wheel.

DESCRIPTION OF THE PREFERRED EMBODIMENT

Referring first to FIGS. 1 and 2, the idler pulley of the invention designated generally at 10 has a first half or sheave 12 and a second half or sheave 14. Sheave 12 includes a cylindrical central hub designated generally at 16 which includes an inwardly turned annular flange 18 at the axially outer side thereof and an annular shoulder 20 at the axially inner side thereof. A web 22 extends generally radially outwardly from the hub and has an axially inwardly facing conical side 24. The other side of web 22 is joined to hub 16 by a series of radially extending strengthening ribs 26 which are disposed in planes containing the axis of hub 16, as may be best seen in FIG. 3. Because, as may be seen in FIG. 1, side 24, the surface of annular shoulder 20 and the inside surface of hub 16 in flange 18 together comprise a continuous surface which does not reverse slope or return bend as measured relative to the axis of hub 16, that continuous surface may be formed by a single mold element movable axially of sheave 12. The same is true for the axially outwardly facing surface of sheave 12, given the fact that ribs 26 lie in axially disposed planes.

Still referring to FIG. 1, second sheave 14 has several parts identical to first sheave 12, including a generally cylindrical hub 28, inwardly turned annular flange 30 on the axially outer side of hub 28. An integral web 32 extends generally radially outwardly from hub 28 and has an axially inwardly facing side 34, with the other side of web 32 being joined to hub 28 by a series of radially extending ribs 36 disposed in planes containing the axis of hub 28. All the above-mentioned parts are symmetrical with their counterparts on first sheave 12. Sheave 14 differs on the axially inward side of hub 28, where hub 28 includes an annular cut-out 38 complementary to shoulder 20. Shoulder 20 is contiguous with a smaller annular shoulder 40 which has an inside diameter equal to the outside diameter of annular shoulder 20. The stepped portion thus comprised also, in cooperation with the surface of inwardly facing side 34 and the inner surface of hub 28, forms a continuous surface any radial cross section of which does not reverse direction relative to the axis of hub 28. Sheave 14 may thus be molded by only two mold members which part along a common axis, as with sheave 12. In addition, the two stepped portions of hubs 28 and 16 are complementary to one another and are closely engageable so that the two may be friction welded together to form a single unit, as best seen in FIG. 2. The unit thus formed will have a V-shaped belt groove 42 formed by the inner surfaces of sides 24 and 34, and there will be no parting lines or discontinuities thereon to potentially cause excessive belt wear.

Additionally, a bearing 44 or separate member may be captured between flanges 18 and 30 during the spin welding process, without the necessity of molding it into the wheel. Furthermore, the strengthening ribs 36 and 26 provide members which may be easily engaged by a suitable rotary power source as the sheaves 12 and 14 are spun oppositely one another to create the heat of friction which accomplishes the weld. It will be understood that the shape of the stepped portions could be different as long as the desired continuous, nonreversing surface is present.

It will be understood that the invention as disclosed is capable of other embodiments and is not to be limited to that disclosed.

The embodiments of the invention in which an exclusive property or privilege is claimed are defined as follows:

1. A belt engaging pulley wheel formed of two moldable pieces, comprising, in combination,
   a first sheave having an axial hub including a stepped portion on the axially inner end thereof and a generally radially outwardly extending web integral with said hub, the axially inwardly facing side of the web and a surface of the stepped portion comprising together a continuous surface any radial cross section of which does not have a return bend relative to the axis of the hub,
   the first sheave further including at least one generally planar, axially disposed rib joining the axially outwardly facing side of the web to the hub whereby the first sheave is moldable by a pair of mold elements that part between the two sides of the web,
   and a second sheave having an axial hub with a stepped portion on the axially inner end thereof complementary to the stepped portion of the first sheave and having a surface sufficiently closely engageable with the surface of the first sheave axially stepped portion to allow friction welding of the two when spun oppositely,
   said second sheave further including a generally radially outwardly extending web integral with said hub, the axially inwardly facing side of the web and a surface of the stepped portion comprising together a continuous surface any radial cross section of which does not have a return bend relative to the axis of the hub,
   the second sheave also including at least one generally planar, axially disposed rib joining the axially outwardly facing side of the web to its hub, whereby the second sheave is moldable by a pair of mold elements which part between the two sides of the web,
   the complementary stepped portions on said first and second sheaves being sufficiently smoothly interrelated with each other so that one does not encumber the other when spun oppositely to thereby allow the two separately molded sheaves to be friction welded together thereat to form a pulley wheel by a rotary power source engageable with the ribs of the sheaves to so spin the sheaves oppositely, the hubs cooperating to form a single hub of the wheel and the two axially inwardly facing surfaces of the web cooperating to form a belt engaging groove.

* * * * *